H. HESS.
JOURNAL BEARING.
APPLICATION FILED SEPT. 17, 1907.
1,062,649.
Patented May 27, 1913.
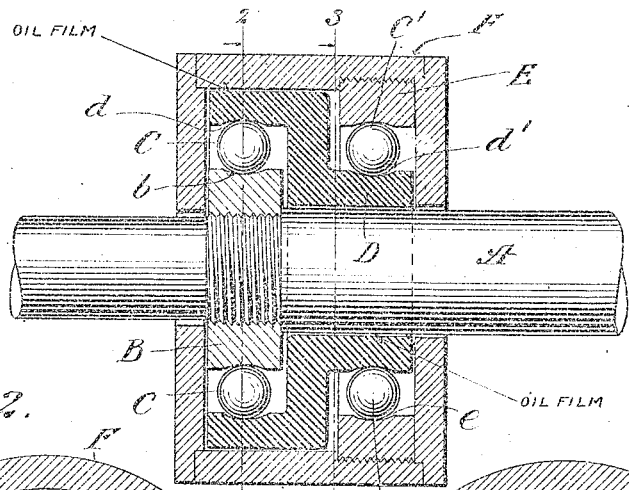
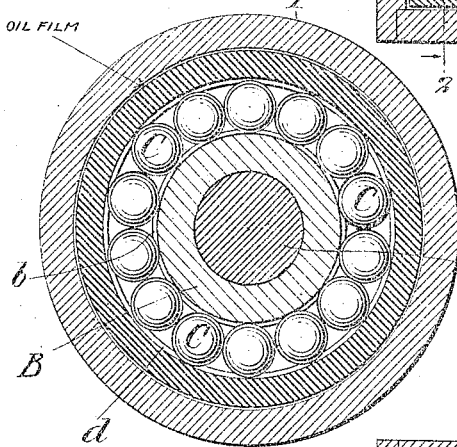
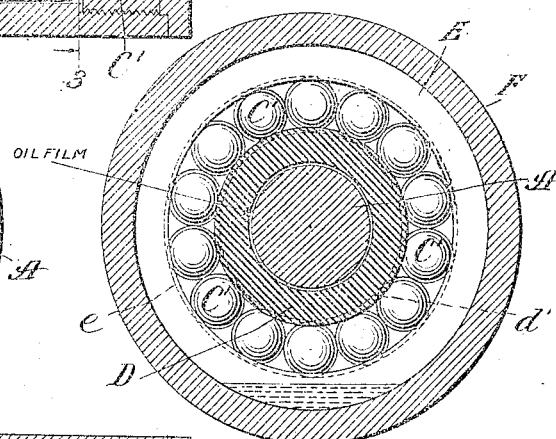
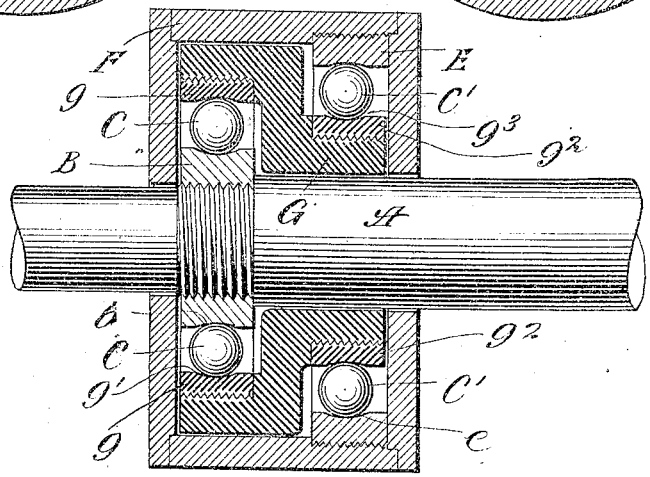
Witnesses:
Inventor:
HENRY HESS,
By his Attorney

UNITED STATES PATENT OFFICE.

HENRY HESS, OF WAWA, PENNSYLVANIA, ASSIGNOR TO THE HESS-BRIGHT MANUFACTURING COMPANY, OF PHILADELPHIA, PENNSYLVANIA, A CORPORATION OF DELAWARE.

JOURNAL-BEARING.

1,062,649.  Specification of Letters Patent.  Patented May 27, 1913.

Application filed September 17, 1907. Serial No. 393,322.

*To all whom it may concern:*

Be it known that I, HENRY HESS, a citizen of the United States, residing at Wawa, in the county of Delaware and State of Pennsylvania, have invented certain new and useful Improvements in Journal-Bearings, of which the following is a specification, reference being had therein to the accompanying drawing.

My invention relates to journal bearings, and in one branch thereof to bearings of that class wherein are employed a plurality of series of balls or other anti-friction elements. In another application for Letters-Patent, Serial No. 393,321 filed Sept. 17th, 1907, I have shown and described and broadly claimed a unit-handling bearing of the multiple-type, and in the same application I have claimed as one species a unit-handling bearing of the multiple-type wherein the several series of balls are in the same plane. It is my purpose in the present case to show, describe, and claim another species, wherein the several series of balls are in different transverse planes.

Another part of my invention relates to an arrangement whereby the undue vibration of the parts is deadened or dampened. It is well known in the art that, under the influence of centrifugal action at high speeds, the balls, because of their "point" contact, cut through the oil-film and soon abrade both themselves and the races. The same cause prevents absolutely true running, or running free from chatter, since the races may move irregularly to the extent of the necessary and unavoidable radial freedom between the balls and races. This difficulty is present in single bearings and is, of course, increased in the multiple-type. In order to obviate the objection, I have provided one or more of the members of the bearing with extended portions located in proximity to the contiguous parts and with only sufficient clearance to permit the formation of oil-films between the extended portions and the contiguous parts,—these oil-films being of sufficient extent to dampen and cushion out the vibration and chatter and to prevent the displacement of the parts.

It is to be understood that the oil films referred to are such as are formed by the cohesion of the lubricating fluid, and are retained in proper position by their adhesion to one or both of the contiguous parts. These parts are so closed to each other that the oil film formed between them is in contact with both of them substantially all the time, and it is this filling up of the space between the parts by the lubricant which has the effect described, namely of deadening or dampening out the vibration. In other words the dampening effect is secured because of the cushion-like and elastic properties of the film.

Referring to the drawing: Figure 1 is a transverse sectional view of a bearing with my improvements applied thereto; Fig. 2 is a sectional view thereof taken substantially on the line 2—2 in Fig. 1; Fig. 3 is a sectional view thereof taken substantially on the line 3—3 in Fig. 1; and Fig. 4 is a view similar to Fig. 1, but illustrating a modification.

Mounted on the shaft A is the ring B which supports and carries the series of balls C, C. The outer casing F of the bearing may be of any desired construction but is shown in the drawing as consisting of an outer cylindrical drum and two side disks having apertures to permit the passage of the shaft A. The ring B and casing F, I term the "casing-members", to correspond to the terminology of the other application. A second series of balls $C^1$, $C^1$, is located parallel to the first-mentioned series and in a different transverse plane. Located between the balls C, C, and $C^1$, $C^1$, is the separating or supporting element D, which is in angular form in cross-section, that is to say, it is provided with a central disk-like portion and two extended flange-like portions projecting at right angles at the opposite ends thereof. The balls C—C are located between the casing-member B and one of the extending portions of the separating element D, and travel in the race-way formed by the grooves $b$ and $d$. Similarly the balls $C^1$, $C^1$, are located between the ring E, connected to the casing-member F, and the other extending portion of the separating element D, and travel in the race-way formed by the grooves $d^1$ and $e$. The extended portions of the separating element D, while in close proximity to the contiguous parts of the casing-member F and the shaft A, nevertheless do not contact with such contiguous parts, but are formed with sufficient clearance to permit the formation of oil-films therebetween.

Because of this construction and arrangement, the series of balls C, C, supports the separating element D, which in turn supports the series of balls C¹, C¹, and again, the latter supports the ring E and casing-member F.

It will be seen that the general principle is the same as in the other application referred to, and that the present arrangement is merely a specific embodiment thereof, the main difference residing in the location of the several series in different transverse planes. Because of this feature, I provide a bearing of smaller diameter and more compact form, and in addition, I am enabled to employ the oil-films for deadening the vibration. It will also be seen that the bearing is of the unit-handling variety, being complete in itself, and capable of application as an entity and without adjustment.

In Fig. 4 is illustrated a slight modification, wherein the balls C, C, are located between the ring B and the separate ring $g$, which latter is attached to the separating element G, the balls running in the customary race-way formed by the grooves $b$ and $g^1$. Here the unit-handling idea is carried still further, as the rings B and $g$ and the balls C, C, form an entity capable of independent attachment to the element G. Similarly, an additional ring $g^2$ is shown in this figure connected to the element G and provided with the groove $g^3$, so that the rings $g^2$ and E with the balls C¹, C¹, also form an independent and separate entity, capable of attachment to the element G. For purposes of illustration, the rings B, E, $g$, and $g^2$, are shown as connected to the shaft A, casing-member F, and separating elements D and G by screw-thread connections. This mode of attachment is, however, quite unessential, as for ordinary purposes I prefer in most instances a smooth, tight-fitting contact to the screw-thread connection. It will also be obvious that many other changes and variations in construction and arrangement may be made without departing from the spirit of my invention. These have to some extent been indicated in the other application referred to.

The bearings of the type described may be assembled in any desired manner, as by filling openings and the like, and I do not wish to limit myself in this respect as it constitutes no part of the invention. One mode of assemblage is indicated in the form shown in Fig. 4, previously described, wherein the ball bearings proper are shown as distinct entities and as capable of being attached and detached to the other portions of the bearing as may be desired.

An inspection of the figures of the drawing will clearly indicate the clearance between the parts and the location of the oil-films previously described. It is to be noted that the films are of considerable extent and that thereby their effect is increased in dampening and smoothing out undue vibration and in preventing chatter and the displacement of parts. Obviously, this principle is capable of broad application, and therefore I do not confine myself to the specific form and arrangement illustrated and set forth.

Having thus described my invention, what I claim and desire to secure by Letters-Patent of the United States is as follows:

1. The combination of two relatively movable parts provided with tracks or ways, an intermediate supporting element provided on its opposite faces with tracks or ways registering with those on said parts and conjointly constituting raceways, and balls located in said raceways, the said supporting element being formed with extended surfaces located in proximity to the relatively movable parts and so closely fitted thereto as to provide for the formation of oil films therebetween, which films prevent actual contact thereof.

2. The combination of two relatively movable parts provided with tracks or ways located in different transverse planes, an intermediate supporting element provided on its opposite faces with tracks or ways registering with those on said parts and conjointly constituting raceways, and balls located in said raceways, the said supporting element being formed with extended surfaces located in proximity to the relatively movable parts and so closely fitted thereto as to provide for the formation of oil films therebetween, which films prevent actual contact thereof.

3. The combination of two relatively movable parts with an anti-friction bearing; which latter comprises a plurality of series of balls, external casing members, and a freely mounted supporting element between the respective series, the supporting element being of angular form so as to locate the several series of balls in different transverse planes, and said element being formed with extended surfaces, located in proximity to the relatively movable parts, and so closely fitted thereto as to provide for the formation of oil films therebetween, which films prevent the actual contact thereof.

In testimony whereof I have affixed my signature in presence of two witnesses.

HENRY HESS.

Witnesses:
MARY M'CALLA,
O. D. M'CALLA.